US 7,661,266 B2

(12) United States Patent
Essig (10) Patent No.: US 7,661,266 B2
(45) Date of Patent: Feb. 16, 2010

(54) METHOD FOR BRAKING A VEHICLE DRIVEN BY MEANS OF A HYDROSTATIC GEARBOX AND ALSO A HYDROSTATIC DRIVE

(75) Inventor: Heinz-Gerhard Essig, Lonsee (DE)

(73) Assignee: Brueninghaus Hydromatik GmbH, Elchingen (DE)

(*) Notice: Subject to any disclaimer, the term of this patent is extended or adjusted under 35 U.S.C. 154(b) by 258 days.

(21) Appl. No.: 11/793,862

(22) PCT Filed: Dec. 13, 2005

(86) PCT No.: PCT/EP2005/013385

§ 371 (c)(1),
(2), (4) Date: Jun. 21, 2007

(87) PCT Pub. No.: WO2006/066759

PCT Pub. Date: Jun. 29, 2006

(65) Prior Publication Data
US 2008/0006028 A1    Jan. 10, 2008

(30) Foreign Application Priority Data
Dec. 21, 2004   (DE) .................. 10 2004 061 558

(51) Int. Cl.
*F16H 47/00* (2006.01)
*F16H 61/42* (2006.01)
(52) U.S. Cl. .................................... 60/431; 60/445
(58) Field of Classification Search ............... 60/431, 60/435, 445; 475/72
See application file for complete search history.

(56) References Cited

U.S. PATENT DOCUMENTS

| 3,797,244 | A |  | 3/1974 | Waters |  |
|---|---|---|---|---|---|
| 3,988,893 | A |  | 11/1976 | Bojas et al. |  |
| 5,890,982 | A | * | 4/1999 | Meyerle | 475/72 |
| 6,276,468 | B1 | * | 8/2001 | Essig et al. | 60/484 |
| 2005/0085979 | A1 | * | 4/2005 | Carlson et al. | 701/51 |

FOREIGN PATENT DOCUMENTS

| CA | 2 342 699 | | 9/2001 |
|---|---|---|---|
| DE | 23 63 762 | A1 | 6/1975 |
| DE | 24 49 464 | A1 | 5/1976 |
| DE | 27 40 024 | A1 | 9/1978 |
| DE | 101 33 358 | A1 | 1/2003 |
| DE | 10133358 | A1 * | 1/2003 |
| DE | 103 32 542 | A1 | 2/2004 |
| EP | 06 166350 | | 6/1994 |
| EP | 0 752 545 | A2 | 1/1997 |
| EP | 1 277 991 | A2 | 1/2003 |

* cited by examiner

*Primary Examiner*—Thomas E Lazo
(74) *Attorney, Agent, or Firm*—Scully, Scott, Murphy & Presser, P.C.

(57) ABSTRACT

The invention relates to a method for braking a vehicle, driven by means of a hydrostatic gearbox (28) and a hydrostatic drive. The hydrostatic gearbox (28) comprises at least one adjustable hydrostatic motor (6,6). The vehicle driven by means of the hydrostatic gearbox (28) may be retarded by an operating brake. On recognition of a certain braking process, the hydraulic motor (6,6) is adjusted to a minimal pivot angle. On recognition of a termination of the certain braking process, the hydraulic motor (6,6) is adjusted to a pivot angle which matches the speed achieved after the braking process.

8 Claims, 5 Drawing Sheets

METHOD FOR BRAKING A VEHICLE DRIVEN BY MEANS OF A HYDROSTATIC GEARBOX AND ALSO A HYDROSTATIC DRIVE

The invention relates to a method for braking a vehicle driven by means of a hydrostatic gearbox and also a corresponding hydrostatic drive.

Mobile operational equipment, such as diggers or wheeled loaders, is generally driven by a hydrostatic gearbox. In this context, a hydrostatic pump, which is connected via operating lines to at least one hydro-motor, is driven by a drive motor designed as a diesel engine. By adjusting the angle of rotation of the hydro-pump or the hydro-motor, the transmission of a hydrostatic gearbox of this kind can be varied, and the driving velocity can therefore be determined. In this context, the potential adjustment of the angle of rotation, and therefore also of the pumping volume of the pump and of the absorption volume of the motor, limit the transmission range, which can be covered by the hydrostatic gearbox.

A hydrostatic gearbox, wherein a gear-shift gearbox is connected to the hydro-motor, is known from DE 101 33 358 A1. This secondary gear-shift gearbox allows a further change of transmission to be implemented by the gear-shift gearbox in addition to the change of transmission of the hydrostatic gearbox. The overall range of driving velocity, over which the vehicle can be operated, is therefore increased. In order to minimise gear-shift jolt, DE 101 33 358 A1 suggests setting the output shaft of the hydro-motor to zero torque for the gear-shift process. Adjustment devices are provided to adjust the pumping volume of the hydro-pump and respectively the absorption volume of the hydro-motor for each of the two axial piston machines. The adjustment devices are supplied with control signals from a control device, so that the angle of rotation of the hydrostatic piston machines is adjusted by a corresponding specification of the control signals by the control device. To set the hydro-motor to zero torque during the gear-shift process, the control device receives a gear-shift signal, on the basis of which it controls the adjustment device of the hydro-motor accordingly. The hydro-motor is therefore set to a minimum absorption volume, at which the braking torque of the hydro-motor is just compensated. In this condition, the output shaft of the hydro-motor is at zero torque and the gear-shift gearbox can select another gear in a load-free manner. After the other gear has been selected, the signal communicated to the control device, is cancelled and the hydro-motor is once again adjusted to a value different from the minimum angle of rotation, which is adapted to the corresponding driving situation.

However, the hydrostatic drive and respectively the method for changing gear as described, have the disadvantage that the hydro-motor is adjusted to a minimum angle of rotation only to allow a gear shift in the gearbox connected downstream. A setting of the output shaft of the hydro-motor to zero torque in other driving situations is not provided in this context. This means that even during a braking process, a torque is applied to the vehicle drive by the hydro-motor or respectively its drive shaft. However, for an optimum braking process by a service brake, it would be advantageous if only the braking moment generated by the service brake acted on the wheels of the vehicle.

The object of the present invention is therefore to provide a method for braking a vehicle driven by means of a hydrostatic gearbox and also a corresponding hydrostatic drive, wherein no additional torque acts on the drive axles during a braking process.

The object is achieved by the method according to the invention with the features of claim 1 and respectively by the hydrostatic drive according to the invention with the features of claim 8.

According to the invention, in the method for braking a vehicle driven by the hydrostatic gearbox with the service brake, a given braking process is initially identified as such. If a given braking situation is present and this is recognised, the absorption volume of the hydro-motor is reduced by adjusting the hydro-motor to a minimum angle of rotation. At this minimum angle of rotation the braking torque of the hydro-motor is, for example, just compensated, so that the output shaft of the hydro-motor is at zero torque. As a result, no further torque is transferred to the vehicle drive by the hydrostatic gearbox, and the vehicle runs freely apart from the influence of the service brake.

A vehicle running freely in this manner provides optimum conditions for braking by a service brake. In order to return to normal driving mode, the end of the given braking process is first identified. After the end of the braking process has been identified, the hydro-motor is once again rotated and accordingly adjusted to an angle of rotation adapted to the velocity reached or respectively to a corresponding absorption volume. The travel of the vehicle is therefore determined once again by the transmission ratio of the hydrostatic gearbox after the release of the service brake.

The dependent claims relate to advantageous further developments of the hydrostatic drive according to the invention and of the method according to the invention.

In particular, it is advantageous to adjust the hydro-pump as well as the hydro-motor to a minimum angle of rotation in order to prevent the drive motor coupled to the hydro-pump from stalling.

If a gear-shift gearbox is disposed downstream of the hydro-motor, it is particularly advantageous to take the additional braking torque caused by the gear-shift gearbox into consideration in the adjustment of the minimum angle of rotation of the hydro-motor. In this case, the output shaft of the gear-shift gearbox is set to zero torque instead of the drive shaft of the hydro-motor.

Furthermore, it is advantageous to measure on a drive shaft the torque of the drive shaft acting there and to take this into consideration in the adjustment of the minimum absorption volume. For example, changing frictional losses are compensated in this manner so that a fixed minimum angle of rotation is not set independently of the state of wear or the operating temperature of the hydrostatic drive; on the contrary, a minimum absorption volume, which actually leads to a zero-torque drive shaft, is set.

A particularly simple hydrostatic drive can be realised, if a signal generated by an ABS control device is used as the signal for the identification of a given braking condition. For instance, this signal can represent the signal for a control intervention of the ABS pump unit. Accordingly, a hydrostatic drive is created, which sets the angle of rotation of the hydro-motor to a minimum value only in critical braking situations. By contrast, in all other situations, in which the adhesion limit of the drive has not been reached, an adjustment of the absorption volume is not required.

If an adjustment is also to be implemented within the range of a normal, non-ABS-controlled braking process, then a pressure sensor should preferably be provided, which transmits a signal to a control device of the hydrostatic gearbox from a given braking pressure generated within a hydraulic braking circuit. This ensures that above a given braking power, only the braking moment generated by the service brake acts on the wheels of the vehicle drive.

The invention is illustrated in the drawings and explained in greater detail in the following description. The drawings are as follows.

Figure 1:
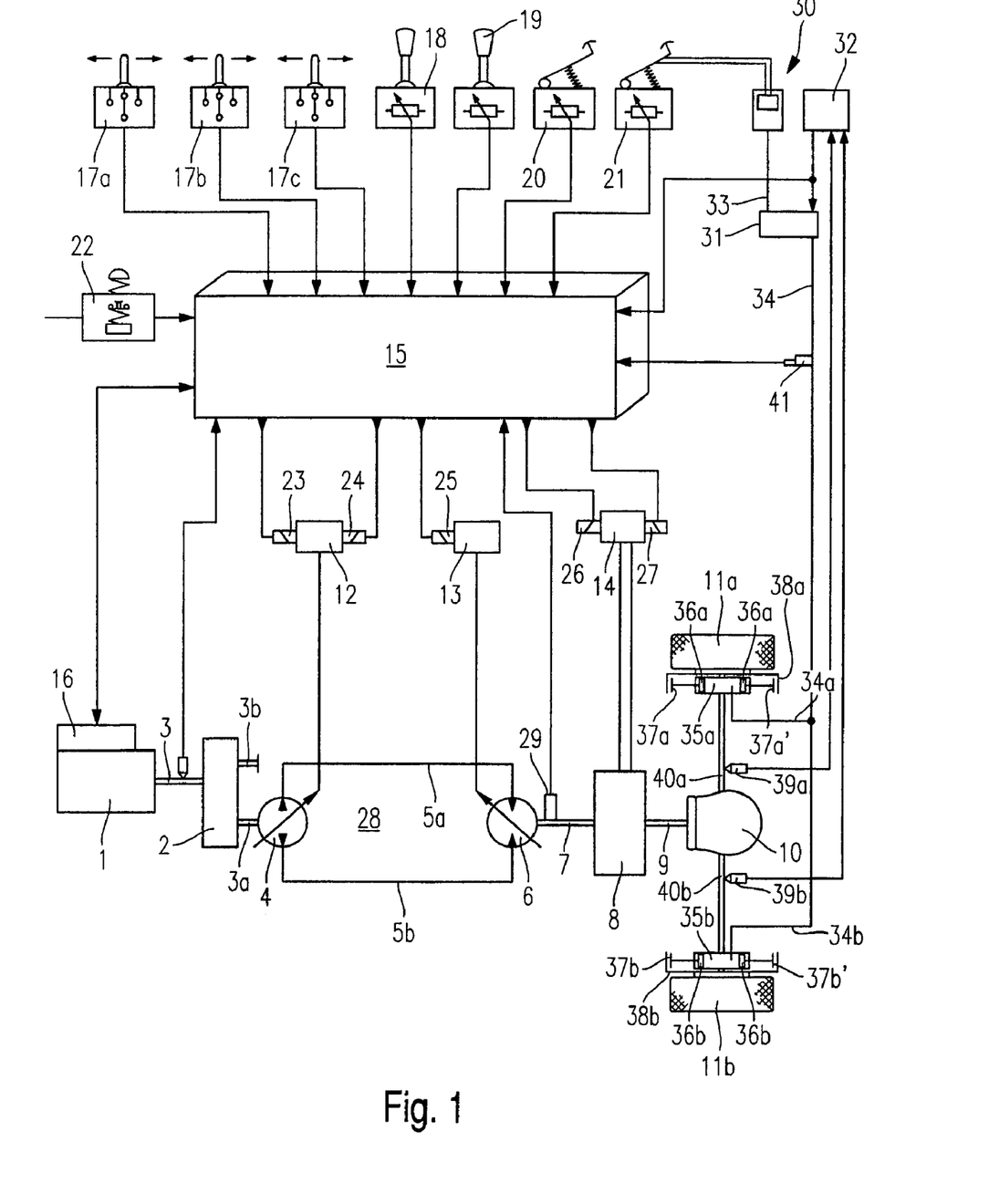
FIG. 1 shows a schematic presentation of a hydrostatic drive according to the invention for the implementation of the method for braking the vehicle.

FIG. 1 shows a schematic presentation of a hydrostatic drive according to the invention and provided for the implementation of the method according to the invention. The hydrostatic drive provides a drive motor 1, which is connected via a shaft 3 to a transfer gearbox 2. In the case of commercial vehicles, such as mobile operational equipment, the drive motor 1 is generally designed as a diesel engine. In the exemplary embodiment presented, the transfer gearbox 2 is connected to the hydro-pump 4 via an output shaft 3a. The pumping volume of the hydro-pump 4 can be adjusted by adjusting its angle of rotation, and the hydro-pump 4 is designed for pumping in two directions. The transfer gearbox 2 can provide a further output shaft 3b, by means of which, for example, further drives can be coupled to the drive motor 1.

The hydro-pump 4 is connected to a hydro-motor 6 via a first operating line 5a and a second operating line 5b. The angle of rotation of the hydro-motor 6 is also adjustable, so that the absorption volume of the hydro-motor 6 can be adjusted.

Together with the adjustable hydro-motor 6 and the first and the second operating line 5a, 5b, the adjustable hydro-pump 4 forms a hydrostatic gearbox 28. The transmission of the hydrostatic gearbox 28 is adjusted by adjusting the angle of rotation of the hydro-pump 4 and hydro-motor 6 and therefore by adjusting the pumping volume of the hydro-pump 4 and the absorption volume of the hydro-motor 6. The output end of the hydro-motor 6 is connected to an output shaft 7. Furthermore, the input of a gear-shift gearbox 8, of which the gearbox-output shaft 9 is connected to a differential gear 10, is connected to the output shaft 7. The differential gear 10 is connected via a first axle shaft 40a and respectively a second axle shaft 40b to the drive wheels 11a, 11b of the vehicle.

An adjustment device 12 acts on the adjustment mechanism of the hydro-pump 4. A further adjustment device 13 acts on the adjustment mechanism of the hydro-motor 6. The angles of rotation of the hydro-pump 4 and the hydro-motor 6 can be adjusted independently of one another by the individual adjustment devices 12, 13. The adjustment device 12 of the hydro-pump 4 is activated by a first and a second electromagnet 23, 24. For this purpose, the two electromagnets 23, 24 are each connected via a signal line to a control device 15. The control device 15 issues control signals to the first and respectively second electromagnets 23 and 24.

The further adjustment device 13, which issues a signal corresponding to the angle of rotation of the hydro-motor 6, is activated by a third electromagnet 25. The third electromagnet 25 is also connected via a signal line to the control device 15, from which it receives corresponding control signals for the adjustment of the absorption volume of the hydro-motor 6.

A switching device 14, which is activated via a fourth electromagnet 26 and a fifth electromagnet 27, is provided in order to implement a gear change in the gear-shift gearbox 8. The gear change in the gear-shift gearbox is also initiated by the control device 15, which is also connected for this purpose via signal lines to the fourth electromagnet 26 and the fifth electromagnet 27.

The power and the speed of the drive motor 1 are also controlled by the control device 15. For this purpose, the control device 15 is connected to an injection pump 16. A quantity of diesel to be injected for the control of the drive motor 1 is specified by the control device 15 to the injection pump 16. For this purpose, the control device 15 processes a series of signals, which characterise the driving condition of the operational unit.

Moreover, a first selector switch 17a, a second selector switch 17b and a third selector switch 17c are connected to the inputs of the control device 15. The first selector switch 17a indicates to the control device 15 the driving range, in which the operational unit is disposed. In this context, a distinction can be made, for example, between on-road travel and off-road travel. The second selector switch 17b is used for gear pre-selection. For example, independently of the other specifications influencing the control device, the user can specify, in which gear the gear-shift gearbox 8 is to be disposed. Finally, the third selector switch 17c specifies the direction of travel of the vehicle.

If the user specifies via the first selector switch 17a that the vehicle is to be disposed in the operational mode, operation via a manual gas lever 18 and a manual driving lever 19 is permitted. A speed of the diesel motor is specified by the manual gas lever 18. The control device 15 controls the injection pump 16 corresponding to the pre-selected speed of the diesel engine. It is therefore possible to control the drive motor 1 to a rotational velocity corresponding to its maximum power independently of the driving velocity. Power not required by the hydrostatic gearbox 28 is therefore available, for example, to the output shaft 3b, in order to drive further drives.

With the rotational velocity specified by the manual gas lever 18, the driving velocity of the vehicle can be specified independently of the rotational velocity within certain limits by a manual drive lever 19; in order to reach the corresponding driving velocity, the pumping volume of the hydro-pump 4 or respectively the absorption volume of the hydro-motor 6 is adjusted by the control device 15 by means of the adjustment device 12 or respectively the further adjustment device 13, by a corresponding change of the respective angle of rotation.

By contrast, if the first selector switch 17a is in a position, which specifies on-road travel, the manual gas lever 18 and the manual drive lever 19 are without function, and the control of the vehicle is implemented via a drive pedal 20 and a brake pedal 21. Since, in the on-road travel mode, the functioning is normally limited to the driving of the vehicle, and other functions, such as the raising or lowering of a shovel, are not performed, a de-coupling between the pre-selected speed of the drive motor 1 and the gearbox of the hydrostatic gearbox 28 is not required. The user merely specifies the required acceleration or deceleration via the drive pedal 20.

If, for example, a faster final velocity is required in on-road travel mode, a gear change must be implemented in the gear-shift gearbox 8, as soon as the hydrostatic gearbox 28 has reached its transmission limit. During the gear change, the hydro-motor 6 is adjusted to the minimum absorption volume, in order to set the output shaft 7 to zero torque. For this purpose, a torque sensor 9 is disposed on the output shaft 7, by means of which the condition "zero torque" is communicated to the control device 15.

A service brake is also provided in order to decelerate the vehicle. The service brake is activated via the brake pedal 21. If the brake pedal 21 is depressed, a pressure is generated in a main brake cylinder 30, which is supplied via a first brake line 33 to the control pump unit 31. The output of the control pump unit 31 is connected via a second brake line 34 and the brake-line branches 34a and 34b to the first wheel-brake cylinder 35a or respectively the second wheel-brake cylinder 35b. The brake pistons 36a,b disposed in the wheel brake cylinders 35a,b are pressed by the hydraulic force to opposite sides of the wheel brake cylinder 35a or respectively 35b. Dependent upon the pressures acting in the wheel-brake cylinders 35a and 35b, the respective brake linings 37a, 37a', 37b, 37b' are pressed against a brake drum 38a or respectively 38b.

Accordingly, the deceleration of the vehicle is determined via the braking pressure generated in the second brake line 34 or respectively the brake-line branches 34a, 34b. However, if the braking pressure is so high that the adhesion limit on one of the wheels 11a, 11b is exceeded, then the ABS engages by reducing the braking pressure in the second brake line 34 for a short time via the control pump unit 31.

A first and a second rotational-velocity sensor 39a and respectively 39b are disposed on the axle shaft 40a and respectively 40b in order to detect the blocking of the wheel 11a and respectively the wheel 11b. For example, if a wheel 11a is blocked, this is detected on the basis of the signal from the rotational-velocity sensor 39a by an ABS control device 32. The ABS control device 32 communicates a signal to the control-pump unit 31, whereupon a valve in the control-pump unit 31 is opened and the second brake line 34 is accordingly relieved.

By way of difference from the exemplary embodiment illustrated, individual hydraulic circuits are conventionally provided respectively for the wheels 11a and 11b, so that only one brake circuit can be relieved by the control-pump unit 31. Because of the declining braking force on the corresponding wheel, the wheel begins to rotate again. The full brake pressure in the second brake line 34 is then built up by the control pump unit 31. FIG. 1 shows a simplified presentation, in which the pressure in the first wheel-brake cylinder 35a and in the second wheel-brake cylinder 35b is generated by a common second brake line 34. In the case of a vehicle with four braked wheels, it is currently conventional to use a so-called 4-channel brake system, in which the pressure can be reduced and built up again individually for each wheel-brake cylinder.

The signal, which triggers the control intervention by the control-pump unit 31, is communicated by the ABS control device 32 not only to the control-pump unit 31, but also to the control device 15 of the hydrostatic vehicle drive. On the basis of the incoming signal, the control device 15 communicates to the third electromagnet 25 an adjustment signal relating to the absorption volume of the hydro-motor 6. The adjustment device 13, which adjusts the hydro-motor to a minimum absorption volume, is activated by the third electromagnet 25. In this context, the minimum absorption volume is an absorption volume different from 0, at which the braking torque of the motor is, for example, compensated. If the braking torque of the hydro-motor 6 is compensated by this minimum absorption volume, the output shaft 7 is at zero torque. A torque sensor 29, which monitors the presence or absence of a torque on the output shaft 7 and communicates a corresponding signal to the control device 15, is provided on the output shaft 7. From the signal of the torque sensor 29, the control device 15 can determine whether the output shaft 7 is actually at zero torque.

If the signal of the torque sensor 29 is used by the control device 15, the angle of rotation of the hydro-motor 6 is established in a dynamic manner. That is to say, the adjustment device 13 does not adjust a fixed angle of rotation of the hydro-motor 6, which is preferably designed as a hydrostatic piston machine, but, by a corresponding tracking of the signal communicated to the third electromagnet 25, the hydro-motor 6 is adjusted in the direction towards a smaller angle of rotation until a minimum absorption volume is reached, which ensures a zero-torque output shaft 7.

Within the control device 15, different ramps can be specified, along which the adjustment device 13 adjusts the angle of rotation of the hydro-motor 6 in the direction towards its minimum absorption volume.

With one preferred method, the pumping volume of the hydro-pump 4 is also adjusted in addition to the absorption volume of the hydro-motor 6. For this purpose, a corresponding control signal from the control device 15 is communicated to the first electromagnet 23 and respectively the second electromagnet 24 of the adjustment device 12. The adjustment device 12 then activates the adjustment mechanism of the hydro-pump 4 and also adjusts the hydro-pump 4 by reducing the angle of rotation to a minimum pumping volume. Adjusting the hydro-motor 4 to a minimum pumping volume prevents the drive motor 1, which is normally disposed in no-load mode during braking, from stalling.

During the further braking process, if road-surface conditions with adequate grip are once again present, the ABS control device 32 terminates the ABS control process on the basis of the signals from the two rotational-velocity sensors 39a and 39b. Accordingly, the signal triggering the control intervention by the control pump 31 is cancelled by the ABS control device 32. Moreover, no signal is then present at the corresponding input of the control device 15, and the hydro-motor 6 and the hydro-pump 4 are once again rotated according to the driving velocity reached at the end of the braking process. The hydro-pump 4 and the hydro-motor 6 are adjusted with reference to the driving velocity reached, in that a corresponding control signal is communicated to the first electromagnet 23 and respectively to the second electromagnet 24 of the adjustment device 12 and the electromagnet 25 of the further adjustment device 13. Dependent upon the respective operating situation, different ramps can be used for approaching the new angle of rotation of the hydro-pump 4 and of the hydro-motor 6. For example, in on-road travel mode, the adjustment to the adapted angle of rotation of the hydro-motor 6 or respectively of the hydro-pump 4 can be implemented, for example, along a different ramp by comparison with use in the off-road travel mode.

The above description of the method for braking a vehicle driven by a hydrostatic gearbox assumes that an intervention regarding the angle of rotation of the hydro-motor 6 and the adjustment of the minimum absorption volume of the hydro-motor 6 is implemented only when an intervention is made by an ABS-controlled braking system. In this case, an improvement in the control performance is achieved through the ABS system by removing the torque from the output shaft 7.

However, the absence of a torque generated by the drive of a vehicle generally has a positive influence on the braking performance of the vehicle. Accordingly, an adjustment to a minimum angle of rotation of the hydro-motor 6 and of the hydro-pump 4 can also be implemented, if an ABS system is not provided. In this case, the pressure signal of a pressure sensor 41, for example, in the second brake line 34 can be used as the signal. If the pressure in the second brake line 34 exceeds a specified value, an adjustment of the hydro-motor in the direction towards its minimum absorption volume is implemented by the control device 15 in a similar manner to that described above. It is also possible to store different values in the control device 15. The various pressure values, at which an intervention into the set angle of rotation of the hydro-motor 6 is implemented, can take into consideration the different requirements, for example, in on-road or respectively off-road operating modes of a digger.

In the exemplary embodiment presented in FIG. 1, the torque sensor 29 is disposed on the drive output shaft 7.

However, it may be particularly advantageous to take into consideration the friction and the accordingly-generated braking torque of the gear-shift gearbox 8 connected downstream. For this purpose, the minimum absorption volume of the hydro-motor 6 is adjusted in such a manner that the braking torque caused additionally by the gear-shift gearbox 8 is also taken into consideration. This is particularly simple, if the torque sensor 29 is disposed in the region of the gearbox output shaft 9. For reasons of cost, however, it is also possible to dispense with the torque sensor 29, and a specified value can be set for the hydro-motor 6 by the adjustment device 13. In a case of this kind, the output shaft 7 or respectively the gearbox output shaft 9 is not completely at zero torque, however, a considerable reduction of the torque acting on the drive is achieved by comparison with a non-adjusted hydro-motor 6.

The additional braking torque caused by the differential gear 10 can also be taken into consideration in the adjustment of the minimum absorption volume of the hydro-motor 6.

Figure 2:
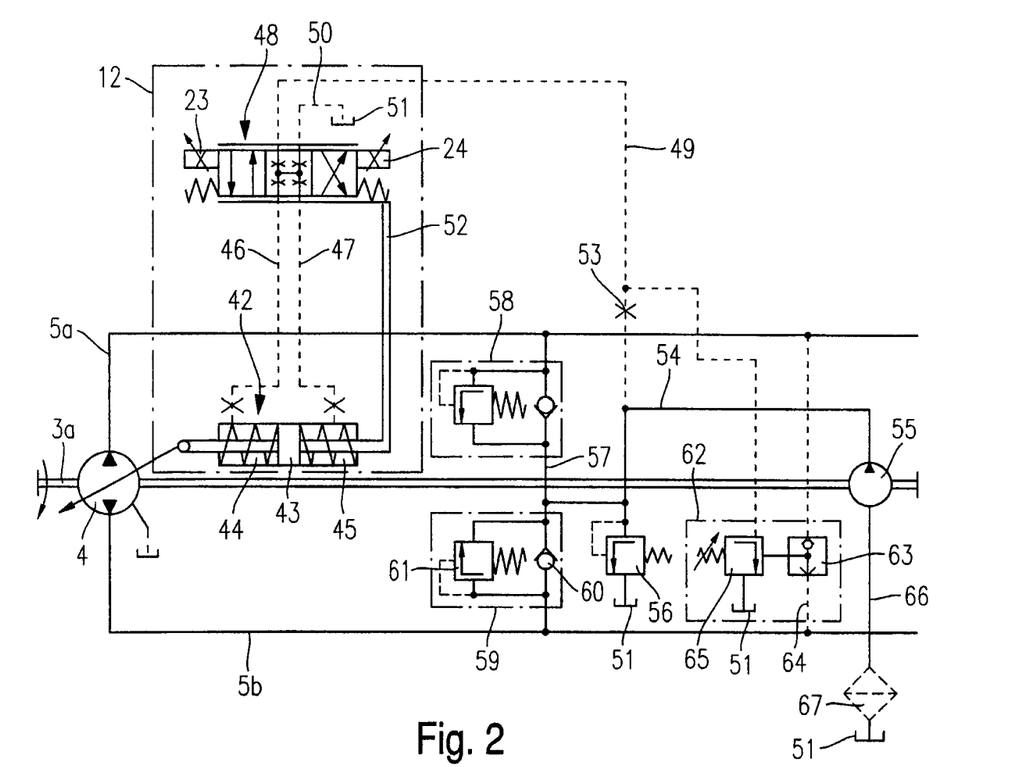
FIG. 2 shows an exemplary embodiment for the connection of a hydro-pump of the hydrostatic drive according to the invention.

FIG. 2 shows a hydraulic circuit diagram for the connection of an adjustable hydro-pump 4. The adjustment of the pumping volume of the hydro-pump 4 is implemented by activating an adjustment mechanism, with which the angle of rotation of a swash plate of the hydro-pump 4 can be adjusted. For this purpose, a piston rod of a regulating piston 43 is connected to the adjustment mechanism of the hydro-pump 4. The regulating piston 43 is disposed in a regulating cylinder 42 and divides the latter into a first regulating-pressure chamber 44 and a second regulating-pressure chamber 45. In addition to the pressure acting in the first regulating-pressure chamber 44 and the second regulating-pressure chamber 45, the force of a centring spring acts additionally on the regulating piston 43 in each regulating-pressure chamber 44, 45.

The first regulating-pressure chamber 44 and the second regulating-pressure chamber 45 can be charged respectively with a regulating pressure, which is supplied via a first regulating-pressure line 46 or respectively a second regulating-pressure line 47. In order to adjust the respective regulating pressure in the first regulating-pressure chamber and respectively the second regulating-pressure chamber 45, the first regulating-pressure line 46 and the second regulating-pressure line 47 are connected via a regulating-pressure control valve 48 either to a pressurised regulating-pressure supply line 49 or to a relief line 50 connected to a tank volume 51.

In FIG. 2, the regulating-pressure control valve 48 is disposed in its resting position. The regulating-pressure valve 48 is designed as a 4/3-way valve and, throttled in the resting position, connects the first regulating-pressure line 46 and the second regulating-pressure line 47 to the regulating-pressure supply line 49 and to the relief line 50. The regulating-pressure control valve 48 is held in this resting position by the force of two further centring springs, so long as no control signal generated by the control device 15 is connected to the electromagnets 23 or 24. The two electromagnets 23 and respectively 24 are preferably designed as proportional magnets.

For example, if a control signal is connected to the first electromagnet 23, it charges the regulating-pressure control valve 48 on the right-hand side in FIG. 2 with a regulating force and therefore activates the regulating-pressure control valve 48 in the direction towards its first end position. In the direction towards the first end position, the first regulating-pressure line 46 is connected increasingly to the regulating-pressure supply line 49. At the same time, in the direction towards the first end position, the second regulating-pressure line 47 is increasingly connected to the relief line 50. Accordingly, in the first end position of the regulating-pressure control valve 48, the first regulating-pressure chamber 44 is pressurised from the regulating-pressure supply line 49 via the first regulating-pressure line 46. At the same time, the second regulating-pressure chamber 45 is relieved via the second regulating-pressure line 47 and the relief line 50 in the direction towards the tank volume 51. Because of the different pressures predominating in the first regulating-pressure chamber 44 and the second regulating-pressure chamber 45, an axial force, which displaces the regulating piston 43 to the right-hand side as shown in FIG. 2, acts on the regulating piston 43. A throttle is preferably disposed respectively in the first regulating-pressure line 46 and the second regulating-pressure line 47.

The regulating movement of the regulating piston 43 generated in this manner, which is transferred to the adjustment mechanism of the hydro-pump 4, is fed back through a piston rod 52 to the regulating-pressure control valve 48. The feedback acts against the original deflection of the regulating-pressure control valve 48 by the first electromagnet 23 and therefore allows a proportional adjustment of the regulating piston 43 with regard to the signal connected to the first electromagnet 23. The hydro-pump 4 can be adjusted in the opposite direction by applying a corresponding control signal to the second electromagnet 24.

The maximum-available regulating pressure in the regulating-pressure chambers 44 and respectively 45 corresponds to the pressure predominating in the regulating-pressure supply line 49. The regulating-pressure supply line 49 is therefore connected at the end facing away from the regulating-pressure control valve 48 to a feeder-pressure line 54. A throttle 53 is disposed in the regulating-pressure supply line 49.

The feeder-pressure line 54 is connected to a pump-side connection of a feeder pump 55. The feeder pump 55 is also connected to the drive shaft 3a, by means of which the hydro-pump 4 is also driven. The feeder pump 55 is designed as a constant pump for pumping only in one direction. The feeder pump 55 draws pressure medium from a tank volume 51 via a vacuum line 66 and an optional filter 67.

The feeder pump 55 is used not only to generate the maximum regulating pressure required for the adjustment device 12, but also to pressurise the entire hydraulic circuit, which is initially pressure-free during start-up. The feeder pressure is generally considerably below the operating pressure, which is generated by the hydro-pump 4. In order to secure the feeder system, the feeder-pressure line 54 is connected to a feeder-pressure limiting valve 56. The pressure in the feeder-pressure line 54 can be limited by the feeder-pressure valve 56, for example, to a value of 25 bar.

For this purpose, the feeder-pressure limiting valve 56 is spring-loaded, wherein the pressure predominating in the feeder-pressure line acts against the force of the spring. If the pressure predominating in the feeder-pressure line 54 exceeds the value specified by the spring, the feeder-pressure limiting valve 56 opens and relieves the feeder-pressure line 54 into the tank volume 51.

The end of the feeder-pressure line 54 facing away from the feeder pump 55 opens into a connecting line 57. The connecting line 57 connects the first operating line 5a to the second operating line 5b. A first feeder-valve unit 58 is disposed between the opening of the feeder-pressure line 54 into the connecting line 57 and the first operating line 5a. Similarly, a second feeder-valve unit 59 is formed between the opening of the feeder-pressure line 54 into the connecting line 55 and the second connecting line 5b. The first feeder-valve unit 58 and the second feeder-valve unit 59 correspond with one another in their structure. To avoid unnecessary repetition, only brief reference will be made below to the structure of the second feeder-valve unit 59.

The second feeder-valve unit 59 provides a non-return valve 60 and a pressure-limiting valve 61 disposed parallel to the latter. The non-return valve 60 is arranged in the connecting line 51 in such a manner that it opens in the direction towards the second operating line 5b. If the pressure generated by the feeder pump 55 in the feeder-pressure line 54 exceeds the pressure predominating in the operating line 5b, the non-return valve 60 opens and the second operating line 5b is pressurised from the feeder-pressure line 54. By contrast, if the pressure in the second operating line 5b is higher than in the feeder-pressure system, the non-return valve 60 closes. In order to prevent a critical increase of the pressure in the second operating line 5b, a pressure-limiting valve 61 is disposed in parallel to the non-return valve 60.

The pressure-limiting valve 61 is also a spring-loaded pressure-limiting valve, wherein the pressure in the second operating line 5b acts against the force of the spring. The pressure in the second operating line 5b acts on a measuring surface of the pressure-limiting valve 61, where it generates a hydraulic force. This hydraulic force acts against the compression spring, so that in the event of a limit value specified by the compression spring being exceeded, the pressure-limiting valve 61 opens and releases a through-flow connection from the second operating line 5b in the direction towards the feeder-pressure line 54. In this manner, the closed non-return valve 60 is bypassed.

In a corresponding manner, the second operating line 5b is relieved in the direction towards the first operating line 5a via the non-return valve of the first feeder-valve unit 58. If a higher pressure than the feeder pressure is also already present in the operating line 5a, the pressure medium removed via the pressure valve 61 of the second operating line 5b is relieved via the feeder-pressure line 54 and the feeder-pressure limiting valve 56 into the tank volume 51.

An unacceptably-high increase in pressure in the first operating line 5a is dealt with in a corresponding manner.

A pressure cut-off valve unit 62 is provided for further security. The maximum regulating pressure available in the regulating-pressure supply line 49 can be reduced by means of the pressure cut-off valve unit 62. The maximum-available regulating pressure can be reduced in this manner, by relieving the regulating-pressure supply line 49 downstream of the regulating-pressure throttle 53 into the tank volume 51. The pressure cut-off valve unit 62 provides a pressure-cut-off valve 65 for this purpose. Accordingly, the pressure cut-off valve 65 is once again spring-loaded with a preferably-adjustable spring and is held in this manner in its closed position. A comparison pressure supplied to a measuring surface of the pressure cut-off valve 65 opposes the force of the adjustment spring on the pressure cut-off valve 65. The comparison pressure is supplied via a shuttle valve 63.

The shuttle valve 63 is disposed in the second connecting line 64, which extends from the first operating line 5a to the second operating line 5b. The respectively higher pressure of the pressures predominating in the operating lines 5a, 5b is supplied via the shuttle valve 63 to the measuring surface of the pressure cut-off valve 65. In the event of an increase of the higher pressure value in the two operating lines 5a,b above a limit value, a through-flow connection is released by the pressure cut-off valve 65, so that the regulating-pressure supply line 49 is connected increasingly to the tank volume 51. As a result, the pressure in the regulating-pressure supply line 49 subsides. Both regulating-pressure chambers 44 and 45 are therefore connected increasingly to the tank volume independently of the position of the regulating-pressure control valve 48. In the then pressure-less regulating-pressure chambers 44 and 45, only the force of the two centring springs, which bring the regulating piston 43 into a central position, acts on the regulating piston 43. In this central position, the hydro-pump 4 is adjusted to a vanishingly-small pumping volume.

The hydro-pump 4 can be rotated from its zero position in two directions. As a result of this rotation in two directions, the hydro-pump 4 can pump both into the first operating line 5a and also into the second operating line 5b. The pumping volume of the hydro-pump 4 can therefore be limited to a minimum value only via a corresponding adjustment of the regulating-pressure control valve 48.

Figure 3:
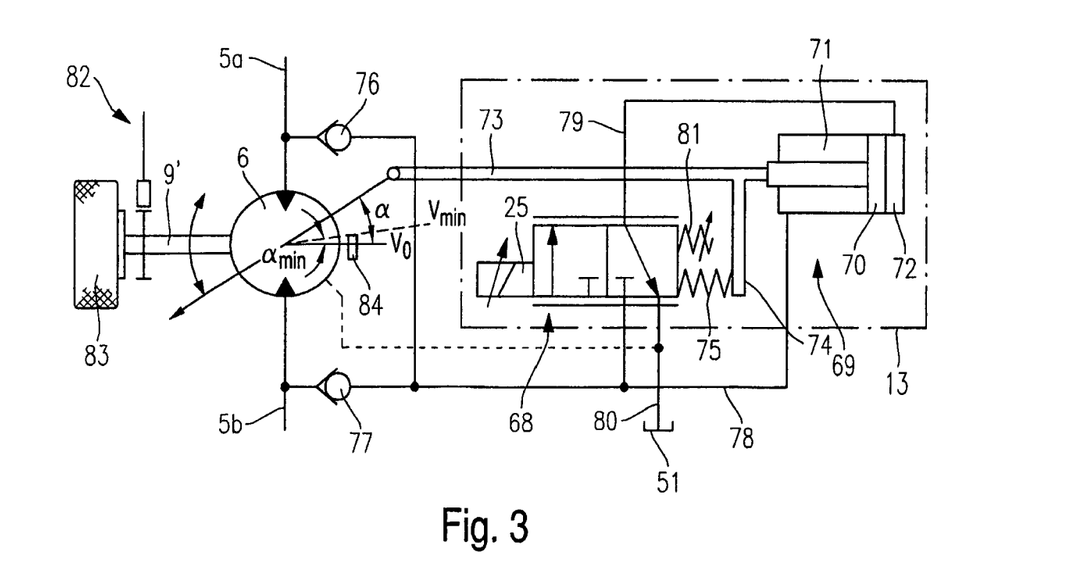
FIG. 3 shows an exemplary embodiment for the connection of a hydro-motor of a hydrostatic drive according to the invention.

FIG. 3 shows a hydraulic circuit diagram for the connection of the adjustable hydro-motor 6.

The hydro-motor 6 takes up the pressure medium pumped from the hydro-pump 4 into one of the operating lines 5a, 5b. The further adjustment device 13 used for adjusting the absorption volume of the hydro-motor 6 provides a second regulating-pressure control valve 68 and a second regulating cylinder 69. A second regulating piston 70, which divides the second regulating cylinder 69 into a third regulating-pressure chamber 71 a fourth regulating-pressure chamber 72 is disposed in the second regulating cylinder 69. The second regulating piston 70 is connected mechanically via a piston rod 73 to the adjustment mechanism of the hydro-motor 6. Moreover, the respective position of the regulating piston 70, which corresponds to the adjusted angle of rotation of the hydro-motor 6, is fed back via a second coupling rod 74 to the second regulating-pressure control valve 68.

Dependent upon the position of the second regulating piston 70, a force is transferred for this purpose in the axial direction via a coupling spring 75 to the second regulating-pressure control valve 68. The force of this coupling spring 75 opposes the force of the third electromagnet 25, which exerts a force on the regulating-pressure control valve 68 dependent upon a signal generated by the control device 15.

In order to generate a regulating pressure in the third regulating-pressure chamber 71 and a resulting hydraulic force on the regulating piston 70, a regulating-pressure connecting line 78 is connected to the third regulating-pressure chamber 71. The regulating-pressure connecting line 78 is connected via a first non-return valve 76 to the first operating line 5a. Via a second non-return valve 77, the regulating-pressure connecting line 78 is connected to the second operating line 5b. The two non-return valves 76 and 77 open in the direction of the regulating-pressure connecting line 78, so that the respectively higher pressure of the two pressures predominating in the operating lines 5a, 5b is supplied to the third regulating-pressure chamber 71.

The pressure acting in the fourth regulating-pressure chamber 72 on the second regulating piston 70 is supplied via a control-pressure line 79. Dependent upon the respective position of the second regulating-pressure control valve 78, the control-pressure line 79 is connected either to the regulating-pressure connecting line 78 or to a tank-connecting line 80. The second regulating-pressure control valve 68 can occupy any required position between its two end positions.

The second regulating-pressure control valve 68 is held in its resting position, in the position illustrated in FIG. 3, by the force of an adjustment spring 81, which is preferably designed to be adjustable. In this resting position, the control-pressure line 79 is connected to the tank volume 51 via the tank connecting line 80. The force of the adjustment spring 81 acts in the same direction as the force of the coupling spring 75 on the second regulating-pressure control valve 68. In the opposite direction, dependent upon a connected control signal of the control device 15, the second regulating-pressure control valve 68 can be charged by the force of the third electromagnet 25. With an application of force from the third electromagnet 25 on the second regulating-pressure control valve 68, the regulating-pressure control valve 68 is deflected in the direction towards its second end position. In this end position, the regulating-pressure connecting line 78 is connected to the control-pressure line 79. Accordingly, the pressure predominating in the regulating-pressure connecting line 78 also acts in the fourth regulating-pressure chamber 72. Accordingly, because of the relatively larger piston surface of the second regulating piston 70 in the fourth regulating-pressure chamber 72, the regulating piston 70 is displaced towards the left as shown in FIG. 3. This displacement continues until a new equilibrium between the force generated by the third electromagnet 25 and the adjustment spring 81 and the coupling spring 75 is achieved, because of the force transferred by the coupling spring 75 to the second regulating-pressure control valve 68.

FIG. 3 shows that the hydro-motor 6 is connected via a shaft 9' directly to a driven wheel 83. The service brake is shown merely as a detail 82 in a very simplified manner. If a control signal is generated upon the activation of the service brake—as already explained in detail with reference to FIG. 1—this control signal is processed by the control device 15, and the angle of rotation of the hydro-motor 6 is adjusted in the direction towards a decreasing absorption volume. With the exemplary embodiment illustrated in FIG. 3, an adjustment in the direction of a smaller absorption volume is achieved by a lower force of the third electromagnet 25 on the second regulating-pressure control valve 68. In this case, the fourth regulating-pressure chamber 72 is connected increasingly to the tank volume 51 by the force of the adjustment spring 81 and the coupling spring 75. Accordingly, the angle of rotation of the hydro-motor 6 is adjusted in the direction towards a smaller angle of rotation until a predetermined value for the minimum angle of rotation is reached. This minimum angle of rotation can be determined, for example, by a mechanical stop 84 in the hydro-motor 6. The hydro-motor is then adjusted in the direction towards a smaller absorption volume until a swash plate disposed in the hydro-motor 6 is in contact with the mechanical stop 84.

However, in order to adjust a minimum angle of rotation, it is not necessary for a mechanical stop 84 to be present in the hydro-motor 6. By specifying a signal of a given value through the control device 15, the third electromagnet 25 of the further adjustment device 13 can be controlled in such a manner that the hydro-motor 6 is adjusted to a minimum angle of rotation corresponding to the minimum absorption volume.

A procedure of this kind has the advantage that the angle of rotation of the hydro-motor 6 can be adjusted, in other operating situations, beyond the mechanical stop in the direction towards a smaller absorption volume. In particular, for example, in the case of a switching process of a gear-shift gearbox connected downstream, the hydro-motor can be adjusted to a different, smaller angle of rotation, so that the braking torque of the hydro-motor is compensated and the output shaft 7 is at zero torque. However, if, during a braking process, a gear is selected by the gear-shift gearbox, in which a control signal is specified by the service brake, the hydro-motor can be adjusted to a minimum angle of rotation different from the latter, wherein the adjusted minimum absorption volume compensates not only the braking torque of the hydro-motor but also the additional braking torque of the gear-shift gearbox or respectively of the differential gear 10.

Figure 4:
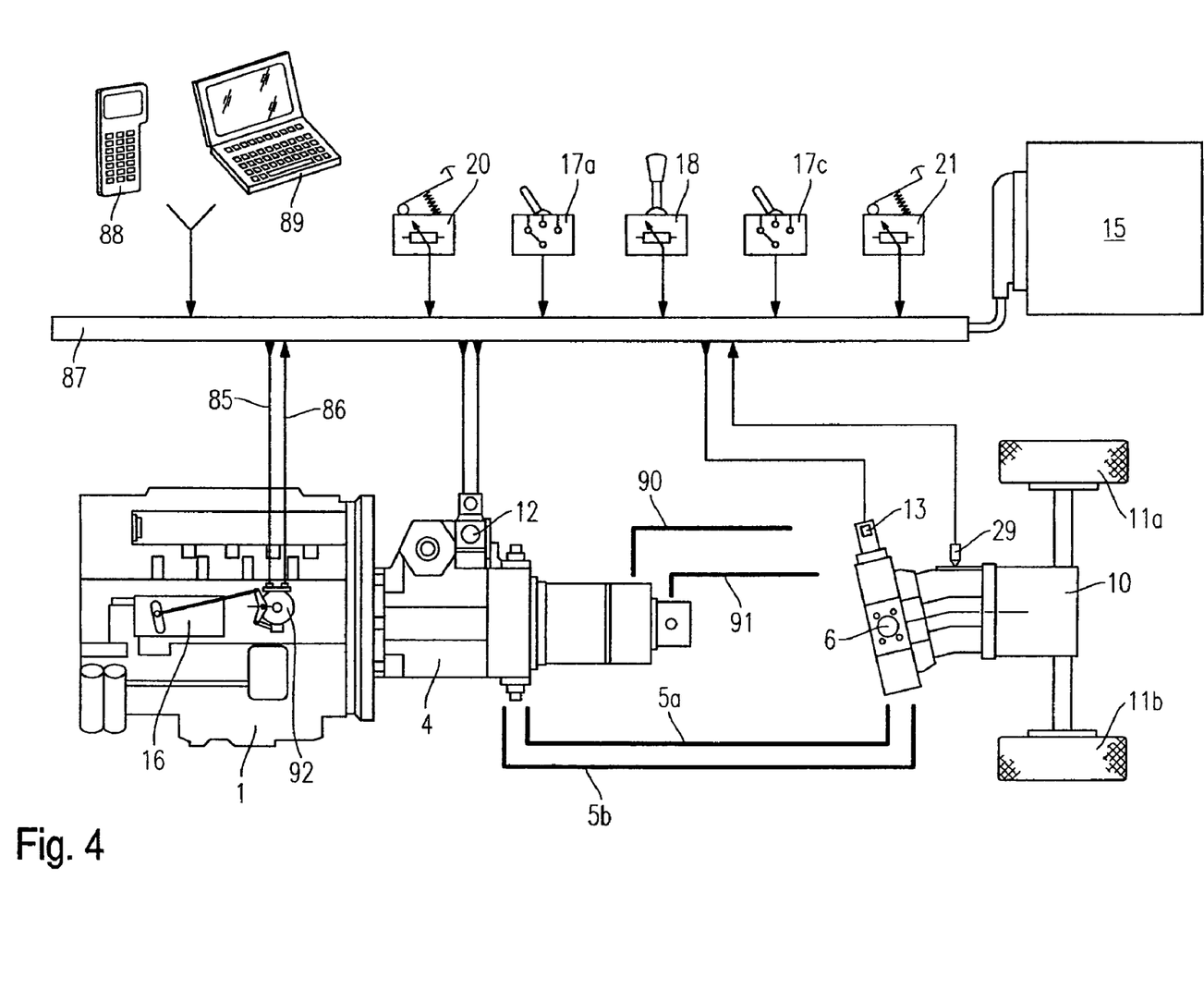
FIG. 4 shows a first exemplary embodiment of a vehicle drive with the hydrostatic drive according to the invention.

FIG. 4 shows, once again in a very much simplified manner, a hydrostatic drive according to the invention. In the exemplary embodiment illustrated in this context, only one hydro-motor 6, which is directly connected to the differential gear 10, for example, of the rear axle of a vehicle, is connected to the hydro-pump 6. The communication between the individual operating elements or the issue of the signal from the control device 15 is implemented via a port 87, which can, for example, be an RS 232 port. The drawing also shows that the injection pump 16 of the drive motor 1 is controlled via a stepping motor 92. For this purpose, the stepping motor 92 is connected via the RS 232 port 87 by a signal line 85 and a further signal line 86 to the control device 15. Furthermore, FIG. 4 shows that, alongside the first operating line 5a and the second operating line 5b, pressure medium is also pumped by the hydro-pump 4 in a further circuit with operating lines 19 and 91. In this manner, another unit can be operated via the further operating lines 90 and 91. For example, it is possible to drive a hydraulic servo-steering unit with pressure medium from the hydro-pump 4.

The illustrated hydraulic system is maintained via service devices 88, 89, which can also gain access to the control device 15 via the RS 232 port. For example, it is possible to read out the error memory of the system or to revise parameter sets by means of the service devices 88, 89. In particular, modified ramps for the adjustment of the minimum angle of rotation of the hydro-motor 6 or respectively the hydro-pump 4 can be stored in this context. It is also possible—for example, when using a pressure signal in the second brake line 34—to set modified limit values to address the adjustment in the direction towards the minimum absorption volume.

Figure 5:
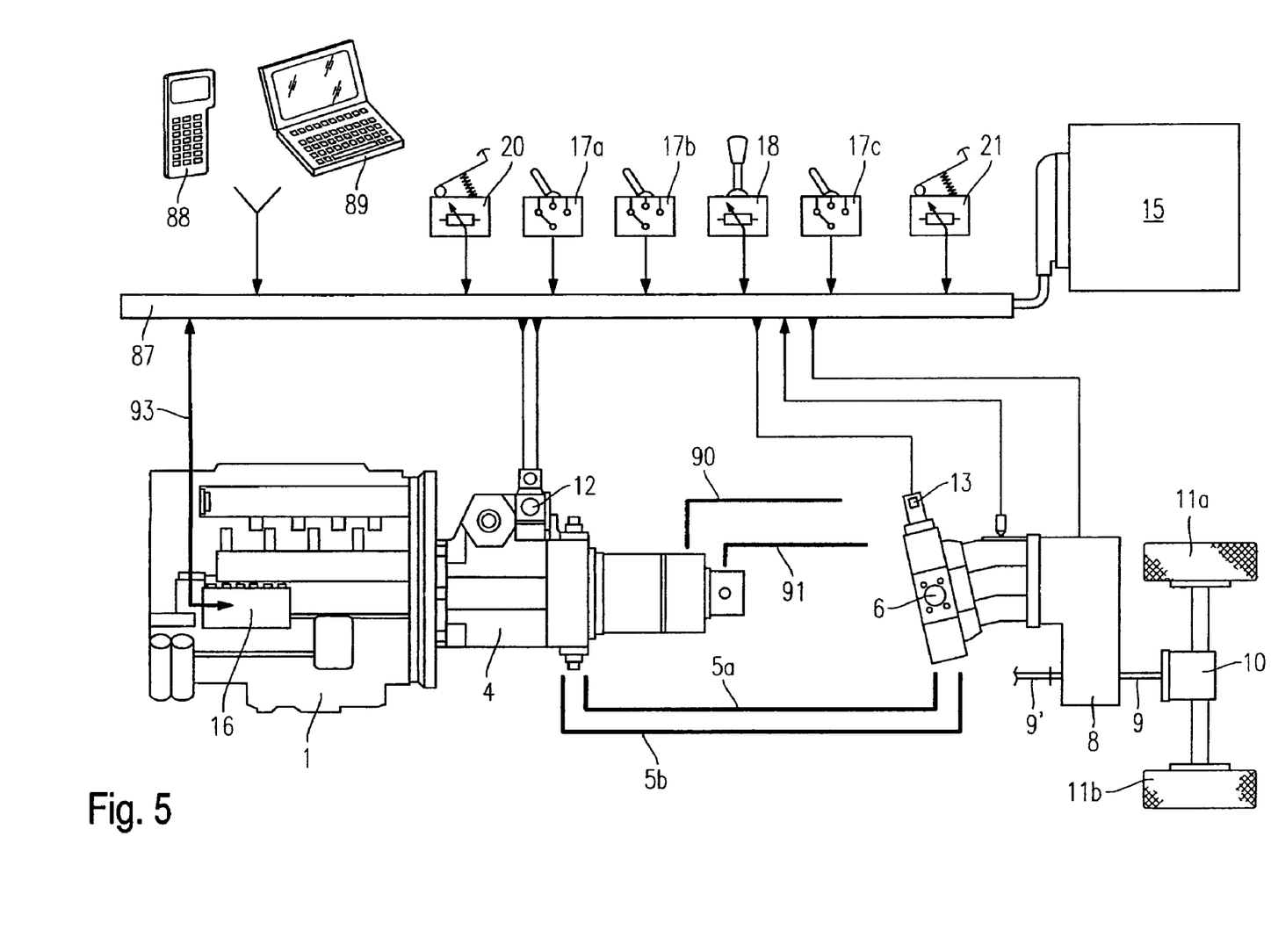
FIG. 5 shows a second exemplary embodiment of a vehicle drive with the hydrostatic drive according to the invention.

The drive system presented in FIG. 5 provides an expanded functionality by comparison with the example shown in FIG. 4. In this context, the hydro-motor 4 is no longer connected directly to the differential gear 10 of the driven axle, but rather to the gear-shift gearbox 8. In the illustrated embodiment of the gear-shift gearbox 8, a further output shaft 9' is provided in addition to the gearbox output shaft 9. This can be connected, for example, via a universally-jointed shaft to a second driven axle. Accordingly, a simple all-wheel system is operated, wherein the drive is implemented with only one hydro-motor 6.

Furthermore, no individual signal lines are provided for controlling the injection pump 16 of the drive motor 1. On the contrary, a connection between the injection pump 16 is achieved via a so-called CAN-bus. The use of a CAN bus of this kind has the advantage that further units also connected to the CAN bus of a vehicle can be addressed or respectively serviced via the same bus system.

Figure 6:
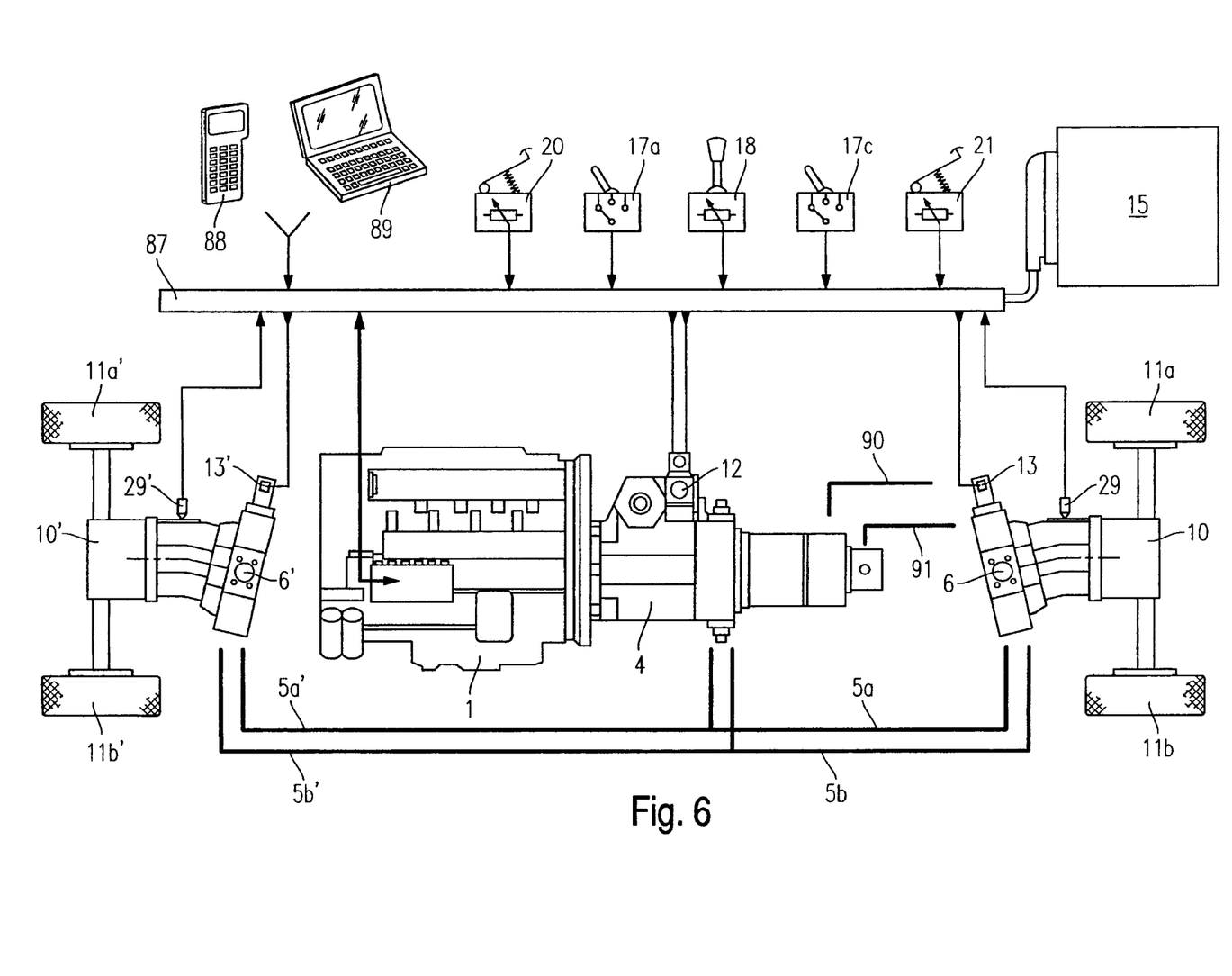
FIG. 6 shows a third exemplary embodiment of a hydrostatic drive according to the invention.

FIG. 6 shows a third exemplary embodiment of a vehicle drive according to the invention. As in the case of the exemplary embodiments shown in FIGS. 4 and 5, elements, which have already been described, are provided with identical reference numbers. In order to avoid unnecessary repetition, reference is made here to the description given above.

In the case of the vehicle drive presented in FIG. 6, one hydro-motor 6, 6' is disposed respectively, for example, on a rear axle and a front axle of the vehicle. By way of difference from the simple all-wheel system already described, in this case, a separate hydro-motor 6 or 6' is provided on each vehicle axle. The hydro-motors 6, 6' are flange connected in each case directly to a differential gear 10, 10'. In order to detect the freedom from torque of the respective drive shaft 7 or 7' of the hydro-motors 6, 6', a separate torque sensor 29 or 29' is provided in each case. The torque sensors 29, 29' also communicate their signals via an RS 232 port 87 to the control device 15.

In order to supply pressure medium via the hydro-pump 4 to the two hydro-motors 6, 6', a further first operating line 5a' and respectively a further second operating line 5b' are provided in addition to the first operating line 5a and the second operating line 5b. In this manner, the hydro-motor 6 and the further hydro-motor 6' are connected to the driving hydro-pump 4 in parallel within a closed-circuit.

The invention is not restricted to the exemplary embodiments above. In particular any features of individual exemplary embodiments can be combined with one another as required.

The invention claimed is:

1. Method for braking a vehicle, which is driven by means of a hydrostatic gearbox with at least one adjustable hydro-motor and which vehicle is capable of being decelerated by a service brake,
    comprising
    identification of a given braking process of the service brake,
    adjustment of the hydro-motor to a minimum angle of rotation,
    identification of the end of the given braking process and
    adjustment of the hydro-motor to an angle of rotation adapted to a vehicle velocity reached as a result of the braking process, wherein the braking torque of the hydro-motor is compensated by the hydro-motor adjusted to the minimum angle of rotation, or alternatively axle shafts associated with the drive wheels are held at zero torque by the hydro-motor adjusted to the minimum angle of rotation.

2. Method according to claim 1,
    wherein
    in addition to the adjustment of the minimum angle of rotation of the hydro-motor, a pumping volume of a hydro-pump of the hydrostatic gearbox is adjusted to a minimum value.

3. Method according to claim 1,
    wherein
    the torque acting on at least on one axle shaft is measured, and the minimum angle of rotation is adjusted dependent upon the torque measured on the axle shaft.

4. Method according to claim 1,
    wherein
    a control signal issued by a control device of the service brake is used for the identification of the given braking process.

5. Method according to claim 1,
    wherein
    a control signal generated, when a brake pressure is exceeded, is used for the identification of the given braking process of the hydraulic service brake.

6. Hydrostatic drive with a hydro-pump and at least one adjustable hydro-motor connected to the latter by a first and a second operating line, which is connected to a vehicle drive, which is brakeable by a service brake for the deceleration of the vehicle,
    wherein
    the angle of rotation of the hydro-motor is adjustable to a minimum angle of rotation dependent upon a control signal of the service brake, the braking torque of the hydro-motor is compensated by the hydro-motor adjusted to the minimum angle of rotation, and wherein axle shafts associated with the drive wheels are held at zero torque by the hydro-motor adjusted to the minimum angle of rotation.

7. Hydrostatic drive according to claim 6,
    wherein
    the control signal is generatable by an ABS control device.

8. Hydrostatic drive according to claim 6,
    wherein
    the service brake comprises a hydraulic circuit, and the control signal is generatable by a pressure sensor.

* * * * *